United States Patent
Li et al.

(10) Patent No.: US 10,904,534 B2
(45) Date of Patent: Jan. 26, 2021

(54) ENHANCEMENT LAYER MASKING FOR HIGH-DYNAMIC RANGE VIDEO CODING

(71) Applicant: Dolby Laboratories Licensing Corporation, San Francisco, CA (US)

(72) Inventors: Cheng-Chi Li, Urbana, IL (US); Guan-Ming Su, Fremont, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 133 days.

(21) Appl. No.: 16/095,338

(22) PCT Filed: Apr. 18, 2017

(86) PCT No.: PCT/US2017/028211
§ 371 (c)(1),
(2) Date: Oct. 19, 2018

(87) PCT Pub. No.: WO2017/184656
PCT Pub. Date: Oct. 26, 2017

(65) Prior Publication Data
US 2019/0141337 A1    May 9, 2019

Related U.S. Application Data

(60) Provisional application No. 62/324,438, filed on Apr. 19, 2016.

(30) Foreign Application Priority Data
Apr. 19, 2016    (GB) .................................. 1606808.2

(51) Int. Cl.
H04N 19/147    (2014.01)
H04N 19/109    (2014.01)
(Continued)

(52) U.S. Cl.
CPC ........... *H04N 19/147* (2014.11); *G06T 5/008* (2013.01); *G06T 5/50* (2013.01); *H04N 19/105* (2014.11);
(Continued)

(58) Field of Classification Search
CPC .. H04N 19/147; H04N 19/105; H04N 19/109; H04N 19/124; H04N 19/126;
(Continued)

(56) References Cited

U.S. PATENT DOCUMENTS 9,497,456 B2    11/2016    Su
9,607,364 B2    3/2017    Xu
(Continued)

FOREIGN PATENT DOCUMENTS

| EP | 2675162 | 12/2013 |
| WO | 2014/107255 | 7/2014 |
| WO | 2015/123067 | 8/2015 |

OTHER PUBLICATIONS

Choi Haechul, SVC Application in Advanced T-DMB, Mar. 1, 2009, p. 56-60 (Year: 2009).*

(Continued)

*Primary Examiner* — Rebecca A Volentine
*Assistant Examiner* — Jimmy S Lee

(57) ABSTRACT

A method to improve the efficiency of coding high-dynamic range (HDR) signals in a dual-layer system is presented. A piece-wise linear, two-segment, inter-layer predictor is designed where base-layer codewords larger than a highlights threshold (Sh) are all mapped to a constant value. Given a target bit rate for the enhancement layer, which can be expressed as a percentage ($\beta$) of the bit rate of the base layer, an optimal highlights threshold is derived by computing estimated bit rates for the base and enhancement layers based on pixel complexity measures of pixels in the input (Continued)

HDR signal and the threshold value, and by minimizing an optimization criterion.

14 Claims, 3 Drawing Sheets

(51) Int. Cl.

| | | |
|---|---|---|
| H04N 19/124 | (2014.01) | |
| H04N 19/182 | (2014.01) | |
| H04N 19/36 | (2014.01) | |
| G06T 5/00 | (2006.01) | |
| G06T 5/50 | (2006.01) | |
| H04N 19/184 | (2014.01) | |
| H04N 19/187 | (2014.01) | |
| H04N 19/149 | (2014.01) | |
| H04N 19/126 | (2014.01) | |
| H04N 19/186 | (2014.01) | |
| H04N 19/105 | (2014.01) | |

(52) U.S. Cl.
CPC ......... *H04N 19/109* (2014.11); *H04N 19/124* (2014.11); *H04N 19/126* (2014.11); *H04N 19/149* (2014.11); *H04N 19/182* (2014.11); *H04N 19/184* (2014.11); *H04N 19/186* (2014.11); *H04N 19/187* (2014.11); *H04N 19/36* (2014.11); *G06T 2207/20182* (2013.01); *G06T 2207/20208* (2013.01)

(58) Field of Classification Search
CPC .. H04N 19/149; H04N 19/182; H04N 19/184; H04N 19/186; H04N 19/187; H04N 19/36; G06T 5/008; G06T 5/50; G06T 2207/20182; G06T 2207/20208
USPC .................................................... 375/240.03
See application file for complete search history.

(56) References Cited

U.S. PATENT DOCUMENTS

| | | | | |
|---|---|---|---|---|
| 2005/0254721 | A1* | 11/2005 | Hagiwara | A61B 6/5258 382/260 |
| 2008/0159387 | A1* | 7/2008 | Dvir | H04N 19/17 375/240.03 |
| 2010/0158127 | A1* | 6/2010 | Kim | H04N 19/176 375/240.16 |
| 2014/0002737 | A1* | 1/2014 | Damberg | H04N 9/64 348/488 |
| 2015/0181253 | A1* | 6/2015 | Yoshino | H04N 19/31 375/240.02 |
| 2016/0065975 | A1* | 3/2016 | Su | H04N 19/126 375/240.01 |
| 2018/0310027 | A1 | 10/2018 | Kamballur Kottayil | |

OTHER PUBLICATIONS

Choi, H. et al., "SVC Application in Advanced T-DMB", 2009, IEEE Transactions on Broadcasting, vol. 55, Issue: 1, pp. 51-61.

Du, H. et al. "Supporting Scalable Multimedia Streaming over Converged DVB-H and DTMB Networks", ICC Workshops, IEEE International Conference on Communications Workshops, Year: 2008, pp. 276-280.

Mai, Z. et al. "Optimizing a Tone Curve for Backward-Compatible High Dynamic Range Image and Video Compression", IEEE Transactions on Image Processing, Year: 2011, vol. 20, Issue: 6 pp. 1558-1571.

White Paper Blu-Ray Disc, "Audio Visual Application Format Specifications for BD-Rom Version 3.0" Jul. 2015.

H.264 "Advanced Video Coding for Generic Audiovisual Services" Infrastructure of Audiovisual Services—Coding of Moving Video Mar. 2009.

H.265 "High Efficiency Video Coding" Infrastructure of Audiovisual services—Coding of Moving Video, Feb. 2018.

SMPTE 2084 "High Dynamic Range Electro-Optical Transfer Function of Mastering Reference Displays" 2014.

Wong, Chau-Wai, et al "Impact Analysis of Baseband Quantizer on Coding Efficiency for HDR Video" Aug. 2016 http://arxiv.org/abs/1603.02980.

* cited by examiner

ENHANCEMENT LAYER MASKING FOR HIGH-DYNAMIC RANGE VIDEO CODING

CROSS REFERENCE TO RELATED APPLICATIONS

The present application claims the benefit of priority from U.S. Provisional Patent Application Ser. No. 62/324,438, filed on Apr. 19, 2016 and Great Britain Patent Application 1606808.2, filed on Apr. 19, 2016, both which are incorporated herein by reference in their entirety.

TECHNOLOGY

The present invention relates generally to images. More particularly, an embodiment of the present invention relates to determine enhancement-layer masking thresholds for the coding of images and video sequences with high dynamic range.

BACKGROUND

As used herein, the term 'dynamic range' (DR) may relate to a capability of the human visual system (HVS) to perceive a range of intensity (e.g., luminance, luma) in an image, e.g., from darkest blacks (darks) to brightest whites (highlights). In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using high-precision (e.g., 16-bit) floating-point formats, such as the OpenEXR file format developed by Industrial Light and Magic.

As used herein, the term "metadata" relates to any auxiliary information that is transmitted as part of the coded bitstream and assists a decoder to render a decoded image. Such metadata may include, but are not limited to, color space or gamut information, reference display parameters, and auxiliary signal parameters, as those described herein.

Most consumer desktop displays currently support luminance of 200 to 300 cd/m² or nits. Most consumer HDTVs range from 300 to 500 nits with new models reaching 1000 nits (cd/m²). Such conventional displays thus typify a lower dynamic range (LDR), also referred to as a standard dynamic range (SDR), in relation to HDR or EDR. As the availability of HDR content grows due to advances in both capture equipment (e.g., cameras) and HDR displays (e.g., the PRM-4200 professional reference monitor from Dolby Laboratories), HDR content may be color graded and displayed on HDR displays that support higher dynamic ranges (e.g., from 700 nits to 5,000 nits or more). As appreciated by the inventors here, improved techniques for the coding and delivery of high-dynamic range images are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
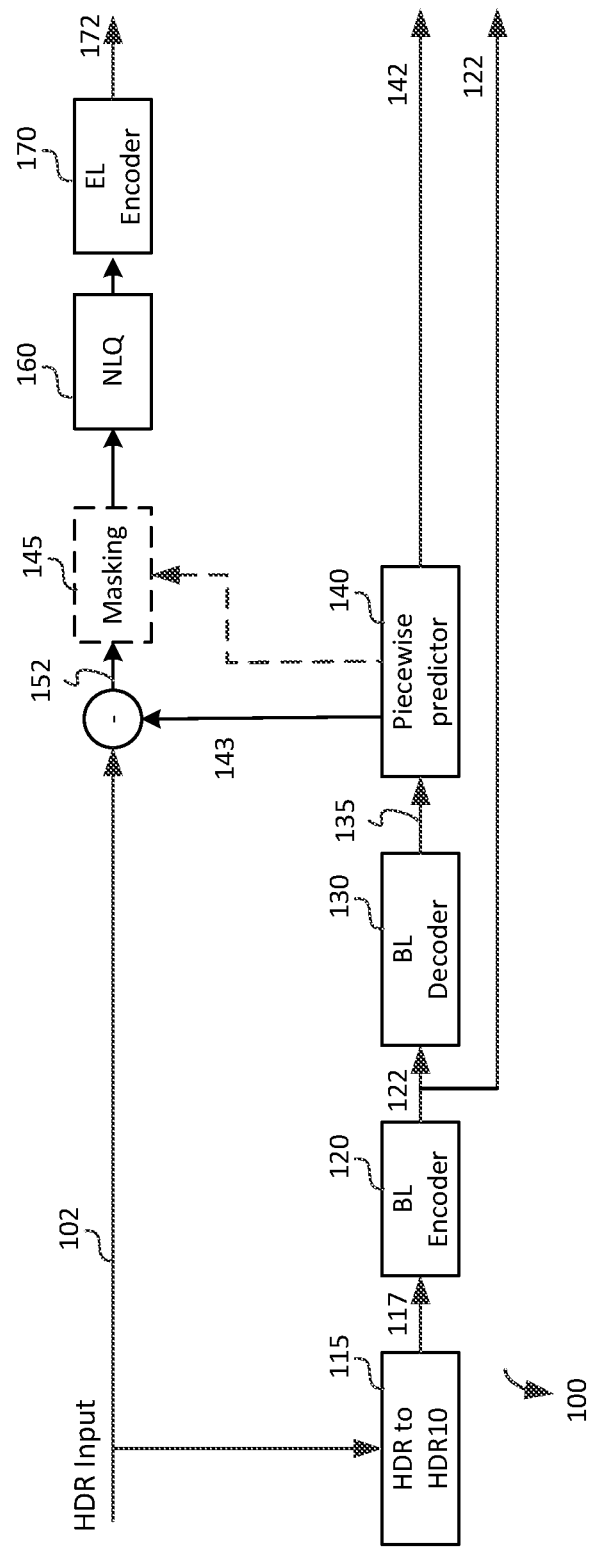
FIG. 1 depicts an example process for the coding and video delivery of HDR video according to an embodiment of this invention.

Video coding and delivery of high dynamic range (HDR) images is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to methods to determine a highlights masking threshold for the layered video coding and delivery of high-dynamic range images. In an embodiment, in a dual-layer encoder, with a base layer encoder and an enhancement layer encoder, in a method to determine a prediction function for an inter-layer predictor between the two layers, a processor accesses a first group of images in a first bit depth. The processor computes pixel complexity measures for pixel values in the first group of images. It receives a target bitrate ratio ($\beta$) specifying the ratio of a target bit rate in the enhancement layer over a target bit rate in the base layer of the encoder. Then, for each of two or more candidate highlight-threshold values, the processor computes an estimated bitrate ratio based on the candidate highlight-threshold value and the pixel complexity measures, wherein the estimated bitrate ratio comprises a ratio of an estimated bit rate in the enhancement layer over an estimated bit rate in the base layer for the candidate highlights-threshold value, wherein in the inter-layer predictor, for all input values to the predictor larger that the candidate highlights-threshold value the corresponding predicted output value is a constant value. The processor computes a distortion measure based on the estimated bitrate ratio and the target bitrate ratio, and outputs as an optimal highlights threshold the candidate threshold value among the two or more candidate highlight-threshold values which minimizes the distortion measure.

Video Delivery for High Dynamic Range (HDR) Video

According to a recent white paper by the Blu-Ray Disc Association, titled, "*Audio Visual Application Format Specifications for BD-ROM Version 3.0*," White paper Blu-Ray Disc Read-only Format (Ultra HD Blu-ray), Blu-Ray Disc Association, July 2015, which is incorporated herein by reference in its entirety, the proposed Ultra HD Blu-ray standard supports a mandatory single-layer (10-bit, YCbCr 4:2:0) Blu-Ray Disc Movie (BDMV) EDR format (also to be referred as the HDR10 format) and an optional Dolby Vision, dual-layer, HDR format. The Dolby Vision HDR stream is composed by a base layer (BL) BDMV EDR video stream and a Dolby Vision enhancement layer (EL) video stream with associated metadata. A generic Blu-ray decoder will only be able to play back the HDR10 base layer; however, a Dolby Vision-enabled player will be able to combine the base layer and the enhancement layer to generate a 12-bit HDR video output with better dynamic range than the dynamic range of the default HDR10 stream.

The Dolby Vision stream is characterized by the following:

BT. 2020 color primaries with non-constant luminance

An EOTF (Electro-optical transfer function) based on SMPTE ST 2084

A combined BL/EL bit depth of 12 bits

FIG. 1 depicts a layered HDR encoder architecture (100) in accordance with an example embodiment. In an embodiment, all video coding in the base and enhancement coding layers may be performed in the YCbCr 4:2:0 color space. HDR image encoder (100) may be implemented by one or more computing devices.

The HDR image encoder (100) is configured to receive a high-resolution (e.g., UHD) input HDR image (102). As used herein, an "input HDR image" refers to an enhanced or high dynamic range image data (e.g., raw image data captured by a high-end image acquisition device and the like) that may be used to derive a HDR version of the input image. The input HDR image (102) may be in any color format that supports a high dynamic range color gamut (e.g., RGB, YCbCr, HLG, ICtCp, and the like). In an embodiment, the input HDR image is a 12-bit or higher YCbCr image, which may have been originally in the RGB space. As used herein, for an image with multiple color components (e.g., RGB or YCbCr), the term n-bit image (e.g., 12-bit or 8-bit image) denotes an image where each pixel of its color components is represented by an n-bit pixel. For example, in an 8-bit RGB image, each pixel comprises of three color components, each color component (e.g., R, G, or B) is represented by 8-bits, for a total of 24 bits per color pixel.

Each pixel may optionally and/or alternatively comprise up-sampled or down-sampled pixel values for one or more of the channels in the color space. It should be noted that in some embodiments, in addition to three primary colors such as red, green and blue, different primary colors may be concurrently used in a color space as described herein, for example, to support a wide color gamut; in those embodiments, image data as described herein includes additional pixel values for those different primary colors and may be concurrently processed by techniques as described herein.

HDR to HDR10 (115) converter converts the high bit-depth HDR input (102) to a BL image (117) of lower depth (e.g., a 10-bit image). Typically, it is beyond the scope of any coding standard on how the 10-bit HDR Layer (117) is generated from the original HDR input (102). Some embodiments may use dynamic-range conversion techniques such as those described in PCT Application Ser. No. PCT/US2013/073085, filed on Dec. 4, 2013, also published as WO 2014/107255, to be referred as the '085 application, which is incorporated herein by reference in its entirety. In some embodiments, given a 12-bit input HDR (102), the 10-bit HDR10 stream (117) may be generated by a simple truncation of the two least significant bits.

BL image encoder (120) is configured to encode/format the BL image (117) to generate a coded (or compressed) BL image (122). BL encoder may be any of the known video encoders, such as those specified by the ISO/IEC AVC (ITU H.264) or HEVC (H.265) standards, or other encoders, such as Google's VP9 and the like.

BL decoder (130) in the HDR image encoder (100) decodes the image data in the base layer image container into a decoded base layer image (135). Signal 135 represents the decoded BL as will be received by a compliant receiver. The decoded base layer image (135) is different from the BL image (117), as the decoded base layer image comprises coding changes, rounding errors and approximations introduced in the encoding and decoding operations performed by the BL encoder (120) and the BL decoder (130).

Predictor (140) performs one or more operations relating to predicting the HDR input signal (102) based on the decoded BL stream (135). The predictor (140) attempts to implement the reverse of operations performed by the HDR to HDR10 converter (115). Example embodiments of such a predictor are described in the '085 PCT Application. The predictor output (143) is subtracted from the HDR input (102) to generate residual 152.

In an embodiment, predictor (140) may be a piecewise-liner predictor. The slopes of the segments in the predictor (140) are used to mask the residual (152) according to a highlights threshold designed according to methods of this invention.

In an example embodiment, an enhancement layer quantizer (NLQ) (160) in the HDR image encoder (100) is configured to quantize the HDR residual values (152) from a high bit-depth digital representation (e.g., 12 bits) to a lower digital representation (e.g., 10 bits or 8 bits) using an NLQ function determined by one or more NLQ parameters. The NLQ function may be linear, piece-wise linear, or non-linear. An example of non-linear NLQ design is described in the '085 PCT Application. Another embodiment will also be presented later on in this specification.

Enhancement layer (EL) encoder (170) is configured to encode the residual values in an enhancement layer image container to generate the coded EL stream (172). EL encoder (170) may be any of the known video encoders, such as those specified by the ISO/IEC AVC or HEVC standards, or other encoders, such as Google's VP9 and the like. EL and BL encoders may be different or they may be the same.

The set of parameters used in the predictor (140) and NLQ (160) may be transmitted to a downstream device (e.g., an HDR decoder) as a part of supplemental enhancement information (SEI) or other similar metadata carriers available in video bitstreams (e.g., in the enhancement layers) as metadata (142). Such metadata may include, but are not limited to, information related to: color space or gamut information, dynamic range information, tone mapping information, or other predictor, up-scaling, and quantizer operators, such as those described herein.

After generating all parts of the layered HDR stream, the coded EL stream (172), the coded BL stream (122), and related metadata (142) are multiplexed and packetized so that they can be stored in a storage medium and/or be transmitted to a decoder.

In a dual layer system, such as the one depicted in FIG. 1, the major function of the enhancement layer is to compensate for the missing information from the base layer. The bit reduction to generate the base layer, in combination with the characteristics of SMPTE 2084 or gamma coding, may result in coding artifacts, such as banding, blocking, or color bleeding, even when an enhancement layer is being employed.

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. An example of a PQ mapping function is given in the SMPTE ST 2084 specification, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidently may have a very rough similarity to the way the human visual system responds, a PQ curve, as described in SMPTE ST 2084, imitates the true visual response of the human visual system using a relatively simple functional model.

It has been observed that PQ coding assigns more codewords in the dark areas than in highlights. As a result, during coding there is an increased occurrence of banding and blocking artifacts or color bleeding in the highlights. It is a goal if this invention to provide methods to reduce such coding artifacts.

In a method described herein, the visual quality of the output is enhanced by using a method denoted as codeword range amplification (CRA). In simple terms, the method operates as follows. Denote the bit depth in the base layer (BL) as b (e.g., b=10), then the total number of codewords in the BL is $B=2^b$ and each un-normalized codeword value is between [0, B−1]. Consider a base layer codeword $S_h < B-1$ such that all codewords in the base layer larger than $S_h$ are predicted with the same value $V_h$. If the enhancement layer is used only for all base layer codewords larger than $S_h$, then the corresponding residual (152) of all codewords in $[S_h, B-1]$ has more of an "image-like" representation and can be coded more efficiently, thus reducing coding artifacts. Methods to determine an optimum $S_h$ threshold according to distortion model are described in the next Section.

The proposed method is fully compliant with existing Dolby Vision decoders which support piecewise-linear or non-linear prediction during decoding.

Codeword Range Amplification

In a typical dual-layer, predictive, codec, the enhancement layer is configured to code directly the residual (152) between the original input and its predicted value. As discussed earlier, in the HDR coding system (100), this residual represents the least significant bits of a high-dynamic input (102), which has statistical characteristics of high-frequency noise data, which are very hard to compress. In this invention, a masking operation (145) restricts the amount of data to be coded by the enhancement layer. This masking, in combination with a non-linear quantizer (160), allows the EL encoder (170) to use more coding bits for a smaller range of image-like input data, thus requiring a far-smaller bit rate for the enhancement layer than traditional dual-layer encoders.

Let $v_i$ denote the i-th pixel in the HDR input (102), which is typically at least 12 bits and may be coded using a PQ or gamma EOTF. Let $s_i$ denote the i-th pixel in the base layer (e.g., HDR10 (117)). In an embodiment, without limitation, both $v_i$ and $s_i$ may be normalized to have values between [0 1). Denote the bit depth in the base layer (BL) as b (e.g., b=10), then the total number of codewords in the BL is $B=2^b$ and each un-normalized codeword value is between [0, B−1].

Figure 2A:
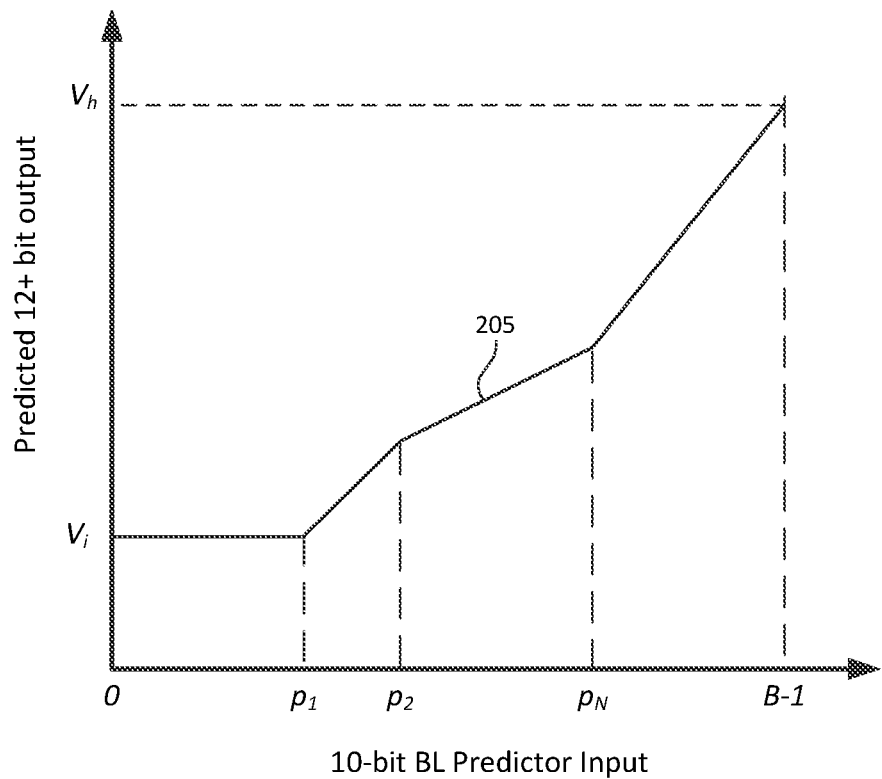
FIG. 2A depicts an example predictor according to prior art.

FIG. 2A depicts an example of a traditional piece-wise prediction function (205) according to prior art. The prediction function may be divided into linear or non-linear segments using N pivot points $p_1, p_2, \ldots, p_N$. The output of the predictor may be constrained to be within the range $(V_l, V_h)$, representing the range between the measured minimum and maximum pixel values in a frame or a scene under consideration. Examples of methods to design such a predictor can be found in PCT Application Ser. No. PCT/US2015/014482, published as WO 2015/123067, "Piecewise inter-layer predictor for signals with enhanced dynamic range," by G-M Su, et al., and U.S. Provisional Patent Application Ser. No. 62/249,779, filed on Nov. 2, 2015, "Piecewise-linear inter-layer predictor for high-dynamic range coding," also filed as PCT Application Ser. No. PCT/US2016/058906, filed on Oct. 26, 2016, each of which is incorporated herein by reference in its entirety.

Figure 2B:
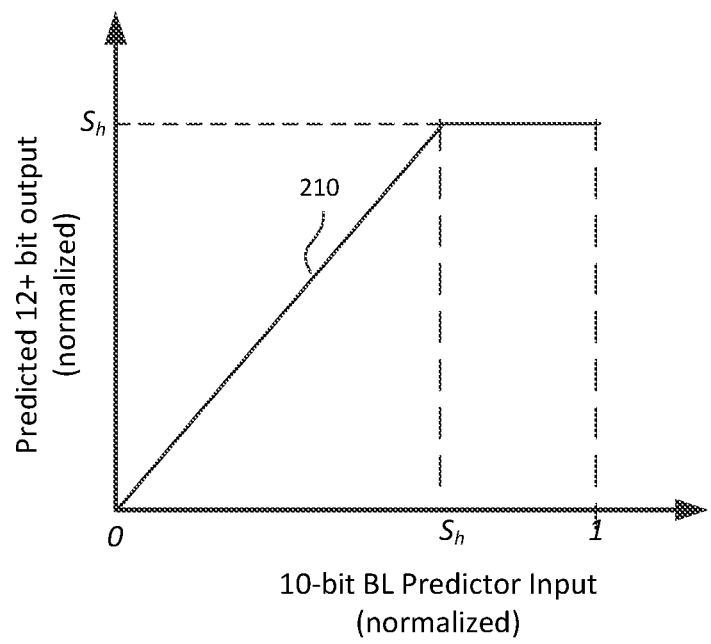
FIG. 2B depicts an example predictor according to an embodiment of this invention.

FIG. 2B depicts an example of prediction function (210) designed according to an embodiment. As depicted in FIG. 2B, the predictor has only two segments, a linear segment from $[0, S_h]$ and a constant segment for any values higher than $S_h$. Hence, for input codewords larger than $S_h$ the residual is simply the difference of the input HDR image from the constant. Such a residual has more of image-like properties than noise properties, hence it is easier to compress. After masking (145), the masked residual (152) may be expressed as:

$$r_i = \begin{cases} 0, & \text{if } s_i < S_h \\ v_i + S_h, & \text{otherwise} \end{cases} \quad (1)$$

The design challenge is to identify the optimum threshold $S_h$.

Non-Linear Quantization

The parameters of the non-linear quantizer (NLQ) (160) may be selected using the methodology in the '085 application. For example, denote the maximal positive residual value in frame $f$ as $X_f^+$ and the absolute value of the minimal negative residual value in frame $f$ as $X_f^-$, or $$X_f^+ = \max\{r_{fi} | i=0, \ldots, p-1\},$$

$$X_f^- = |\min\{r_{fi} | i=0, \ldots, p-1\}|, \quad (2)$$

where p denotes the number of pixels in frame $f$.

For a scene with F frames, one can find the maximal value of $X_f^+$ among all F frames, and maximal value of $X_f^-$ among all F frames, e.g., $$X^+ = \max\{X_f^+ | f=1, \ldots, F\},$$

$$X^- = \max\{X_f^- | f=1, \ldots, F\}. \quad (3)$$

Given the bit-depth of the enhancement layer encoder, EL_bitdepth (e.g., 10 bits), the NLQ setting for the entire scene may be adjusted as $$\text{Offset} = (2^{EL\_bitdepth} - 1)\frac{X^-}{X^- + X^+} \quad (4a)$$

$$\text{Level} = \max\{(2^{EL\_bitdepth} - 1) - \text{Offset}, \text{Offset}\}$$

$$X_{MAX} = (1 + \Delta)\max\{X^-, X^+\},$$

where $\Delta$ is a small constant.
Let $$SL = \frac{\text{Level}}{X_{max} - T}, \quad (4b)$$

where T is a relatively small number and in some embodiments T=0.
Then, given input residuals r, after clipping r within the range $(-X_{MAX}, X_{MAX})$, the quantization operations in (160) may be expressed as $$Q(r) = \begin{cases} \text{floor}(\text{Offset} + (SL^*(r-T)) + 0.5) & \text{if } r > T \\ \text{Offset} & \text{if } |r| \leq T \\ \text{floor}(\text{Offset} + (SL^*(r+T)) - 0.5) & \text{if } r < -T \end{cases} \quad (5)$$

where Q(r) denotes the quantized output, SL denotes the slope of Q(r) within (T, $X_{MAX}$), and the Offset value representing the output codeword when the residual r=0.

Parameters T, Offset, $X_{MAX}$, and SL (or Level) may be defined separately for each color component of residual signal r and may be communicated to a receiver using metadata. In some embodiments, one or more of the NLQ quantization parameters may also be defined for a whole frame, one or more partitions or sub-regions of a frame, or for a group of frames (e.g., a scene).

Selecting a Masking Threshold $S_h$

From FIG. 2B, a higher masking threshold $S_h$ allows for a smaller number of input codewords to be coded in the enhancement layer, thus allowing for finer quantization, but it covers a smaller range of highlight pixel values. A lower threshold value yields coarser quantization, but supports a wider range of highlights. An optimal threshold, one that minimizes the overall distortion under certain criteria, may be derived as follows.

Let b denote the bit-depth of the input HDR stream $v_i$. Denote a set $$\Phi_m = \left\{ i \,\middle|\, v_i = \frac{m}{2^b} \right\}$$

to represent the pixel index having pixel value $$\frac{m}{2^b}.$$

The number of elements in the set $\Phi_m$ is $h_m$. Thus, the histogram of all (normalized) $\{v_i\}$ pixels can be represented as $\{h_i\}$ with $2^b$ bins. Without limitation, one measure of pixel complexity or activity in a frame is the local pixel variance or standard deviation. For example, let $n_i$ be the $W_o \times W_o$ block centering at pixel i (e.g., $W_o$=8 or 16). In an embodiment, the local standard deviation, $\sigma_i$, for pixel i may be computed as:

$$\mu_i = \frac{1}{W_\sigma^2} \sum_{j \in n_i} v_j, \quad (6)$$

$$\sigma_i = \sqrt{\frac{1}{W_\sigma^2} \sum_{j \in n_i} (v_j - \mu_i)^2}. \quad (7)$$

Then, given all pixel values with value m, their cumulative standard deviation may be computed as $$w_m = \sum_{i \in \Phi_m} \sigma_i. \quad (8)$$

Similarly, the average standard deviation at bin m is given by $$g_m = \frac{1}{h_m} \sum_{i \in \Phi_m} \sigma_i. \quad (9)$$

In an embodiment, an example of computing $w_m$ values is shown below in pseudocode.

```
% divide the input image into non-overlapping blocks (e.g., 8 x 8 or 16 x 16 blocks)
set all w_m = 0; h_m = 0; m = 0, 1, 2, ..., 2^b−1
for each block (i) in the input image;
    compute its standard deviation σ_i ; % (e.g., using equations (6) and
    (7)) for each pixel value (v_j) in the block
        if (v_j == m) {
            w_m = w_m + σ_i;
            h_m = h_m + 1;
        }
    end
end
```

The code above takes into consideration that most modern image and video codecs (such as AVC and HEVC) are block-based and that typically the standard deviation of an image block provides a very good metric to adjust its quantization according to the desired target bit rate. A person skilled in the art would appreciate that metrics based on the standard deviation of input codewords represent just one way to predict the allocated bits per codeword, and that alternative pixel complexity methods, as known in the art, could be applied.

In most coding systems, the combined bit rate allocated to both the base layer and the enhancement layer is specified based on the storage and/or streaming requirements. Let $R_{BL}$ denote the target bit rate for the base layer and let $\beta$ denote the percentage (e.g., 20%) of the BL bit rate allowed for the enhancement layer, or $R_{EL} = \beta R_{BL}$. Assuming a bit-rate control based on a function of the activity within a given frame, the bit rate of the base layer may be approximated as $$\hat{R}_{BL}(R_{BL}) = \sum_{m=0}^{2^b-1} h_m \cdot f_{BL}(g_m, R_{BL}), \tag{10}$$

where $f_{BL}(g_m, R_{BL})$ denotes a bit-allocation function based on the bit-depth of the BL codec and the target bit rate $R_{BL}$.

Given a threshold $S_h$, and given that only codewords larger than $S_h$ are coded in the enhancement layer, the bit rate allocation in the enhancement layer may be approximated using $$\hat{R}_{EL}(S_h, R_{EL}) = \sum_{m=S_h \cdot 2^b}^{2^b-1} h_m \cdot f_{EL}(g_m, R_{EL}), \tag{11}$$

where $f_{EL}(g_m, R_{EL})$ denotes a bit-allocation function based on the bit-depth of the EL codec and the target bit rate $R_{EL}$. In an embodiment, it may be assumed that the $f_{EL}$ and $f_{BL}$ functions are inter-related via a transfer function $f_t(\ )$, as in $$f_{EL}(\cdot, \cdot) = f_t(f_{BL}(\cdot, \cdot)). \tag{12}$$

When both layers use the same codec and at the same bit-depth (say, HEVC Main 10), in an embodiment, the $f_t$ function may be modeled as a simple linear function with a constant slope $\alpha$ (e.g., $\alpha = 0.8$), as in $$f_t(x) = \alpha \cdot x. \tag{13}$$

Consider an optimum threshold, $S_h^*$. Let $$T_{S_h}(R_{BL}) = \frac{\hat{R}_{EL}(S_h^*, R_{EL})}{\hat{R}_{BL}(R_{BL})} = \frac{\sum_{m=S_h^* \cdot 2^b}^{2^b-1} h_m \cdot f_{EL}(g_m, R_{EL})}{\sum_{m=0}^{2^b-1} h_m \cdot f_{BL}(g_m, R_{BL})}, \tag{14}$$

denote the ratio of approximated bit rates $\hat{R}_{EL}$ and $\hat{R}_{BL}$, which needs to be as close to the target $\beta$ ratio as possible. Given equation (12), equation (14) yields $$T_{S_h}(R_{BL}) = \frac{\sum_{m=S_h^* \cdot 2^b}^{2^b-1} h_m \cdot f_t(f_{BL}(g_m, R_{BL}))}{\sum_{m=0}^{2^b-1} h_m \cdot f_{BL}(g_m, R_{BL})}. \tag{15}$$

Under the simplified case, where the quantizers in both encoders are related via a linear function, from equation (13), equation (15) yields $$T_{S_h}(R_{BL}) = \frac{\sum_{m=S_h \cdot 2^b}^{2^b-1} \alpha \cdot w_m}{\sum_{m=0}^{2^b-1} w_m}. \tag{16}$$

Then, the optimal threshold may be found as the one that minimizes the difference between the estimated ($T_{S_h}$) and the target bit ratio $\beta$, as:

$$S_h^* = \underset{S_h}{\operatorname{argmin}}(|\beta - T_{S_h}(R_{BL})|). \tag{17}$$

Experimental results indicate that the threshold computed using equation (17) is very close to a threshold computed by measuring the Peak Signal to Noise ratio (PSNR) of the coded images and selecting the threshold that maximizes PSNR.

From a computational point of view, notice that given $w_m$ values, the denominator in (16) needs to be computed only once. After computing the denominator, computing (17) involves only computing a running sum of scaled $w_m$ values, for the codewords from $S_h \cdot 2^b$ to B−1. Typically, the threshold will be computed on a per scene basis; however, it can be computed on a per frame, or frame-region as well. As far as decoding is concerned, the prediction function (210) can be represented by two linear functions separated by pivot $S_h$. The first segment is a 1$^{st}$-order polynomial y=ax+b, with a=1 and b=0. The second polynomial is a constant with a fixed value (e.g., y=$S_h$). In a decoder, given decoded and inverse-quantized base layer input data $s_i$, the estimated HDR output will be given by $$\hat{v}_i = \begin{cases} s_i & \text{if } s_i < S_h \\ r_i + S_h & \text{otherwise} \end{cases}. \tag{18}$$

Figure 3:
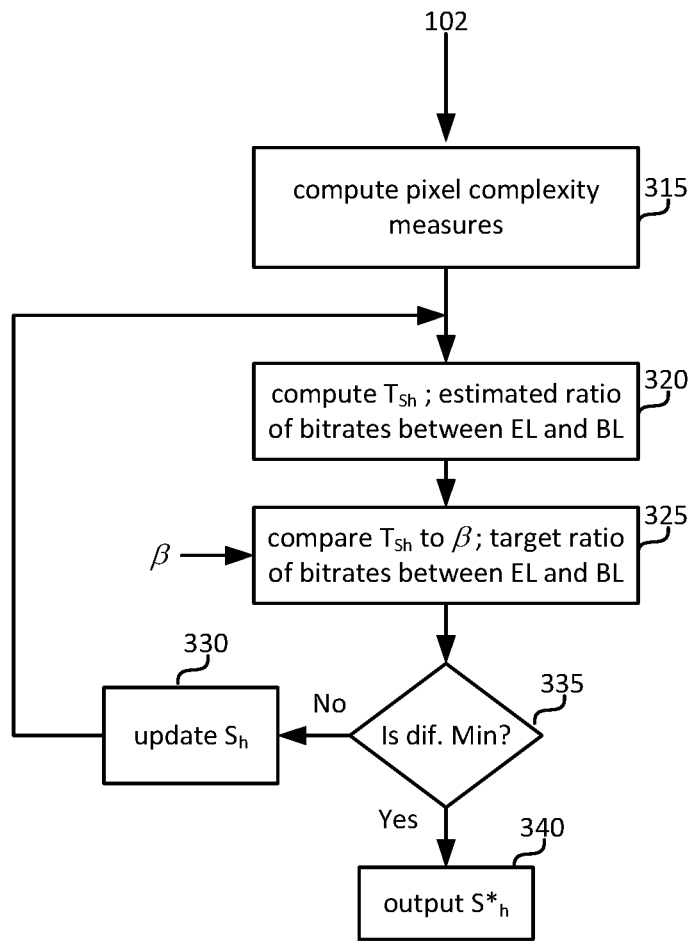
FIG. 3 depicts an example process for determining the threshold for highlights masking in HDR coding according to an embodiment of this invention.

FIG. 3 depicts an example process for determining the optimum masking threshold for the enhancement layer according to an embodiment. Given the HDR input (102), in (315), pixel complexity measures, e.g., the $w_m$ sums of standard deviation values (and optionally, $h_m$ histogram values), are computed (e.g., using equations (6)-(8) and/or the block-based algorithm described earlier). Then, for a given threshold $S_h$, in (320), the corresponding $T_{S_h}$ values are computed according to a bit-rate allocation model (e.g., using equations (15) or (16)).

$$\text{Given} = \frac{R_{EL}}{R_{BL}},$$

the target ratio of the bitrates in the enhancement layer and the base layer, in (335), the value of $d_{S_h} = |\beta - T_{S_h}|$, an estimated distortion value, is computed. Steps (320) to (335) are repeated for different values of $S_h$, until an optimal threshold value ($S_h^*$), one that minimizes $d_{S_h}$, is found.

The previous discussion assumed a single highlights threshold for which all residuals are coded in the enhancement layer. The proposed scheme can easily be expanded to have two masking thresholds, one in the highlights ($S_h$), as discussed earlier, and one in the blacks ($S_l$), or replace the highlights threshold with a blacks threshold ($S_l$). For example, the masked residual (152) will be given by $$r_i = \begin{cases} v_i - S_l, & \text{if } 0 < s_i \leq S_l \\ 0, & \text{if } S_l < s_i < S_h \\ v_i - S_h, & \text{if } s_i \geq S_h \end{cases} \quad (19)$$

when using two thresholds, and by $$r_i = \begin{cases} v_i - S_l, & \text{if } s_i \leq S_l \\ 0, & \text{otherwise} \end{cases}, \quad (20)$$

when using a single blacks threshold.

When using two thresholds, in an embodiment, one may use equation (17) to determine the optimum $S_h^*$ value assuming a single threshold, and then divide the range $1-S_h^*$ into two parts so that given $S_l$, $S_l+(1-S_h)=(1-S_h^*)$, or $S_h = S_h^* \cdot S_l$. In another embodiment, equation (16) may be adapted as $$T_{S_h}(R_{BL}) = \frac{\sum_{m=0}^{S_l 2^b} \alpha \cdot w_m + \sum_{m=S_h \cdot 2^b}^{2^b-1} \alpha \cdot w_m}{\sum_{m=0}^{2^b-1} w_m}, \quad (21)$$

and then apply a joint-search technique to identify the two optimum thresholds.

When using a single black threshold, for $S_h=1$, equation (21) yields $$T_{S_l}(R_{BL}) = \frac{\sum_{m=0}^{S_l 2^b} \alpha \cdot w_m}{\sum_{m=0}^{2^b-1} w_m}, \quad (22)$$

and equation (17) becomes $$S_l^* = \underset{S_l}{\operatorname{argmin}}(|\beta - T_{S_l}(R_{BL})|). \quad (23)$$

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to video coding and delivery of HDR video, such as those described herein. The computer and/or IC may compute any of a variety of parameters or values that relate to video coding and delivery of HDR video processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to video coding and delivery of HDR video as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to the efficient video coding and delivery of HDR video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. In a dual layer encoder, comprising a base layer (BL) encoder and an enhancement layer (EL) encoder, a method to design a piecewise-linear inter-layer prediction function for coding high-dynamic range images, the method comprising:
   receiving with a processor a first image in a first bit depth;
   computing pixel complexity measures for pixel values in the first image;

receiving a target bitrate ratio (β), the target bitrate ratio comprising a ratio of a target bit rate in the enhancement layer over a target bit rate in the base layer of the encoder;

for each of two or more candidate highlights-threshold values for determining an optimum highlights threshold in an inter-layer prediction function, wherein for all input values to the prediction function larger that the optimum highlights threshold value the corresponding predicted output value is a constant value:

computing an estimated bitrate ratio based on the candidate highlight-threshold value and the pixel complexity measures, wherein the estimated bitrate ratio ($T_{S_h}$) comprises a ratio of an estimated bit rate in the enhancement layer over an estimated bit rate in the base layer for the candidate highlights-threshold value, as in $$T_{S_h} = \frac{\sum_{m=S_h 2^b}^{D} \alpha * w_m}{\sum_{m=0}^{D} w_m},$$

wherein $w_m$, for m=0 to D=$2^b$−1, denote a pixel complexity measure for all pixels with value m, α is a constant, $S_h$ denotes a candidate highlights-threshold value in [0, 1), and b is the bit-depth in the base layer encoder;

computing a distortion measure based on the estimated bitrate ratio and the target bitrate ratio; and outputting as the optimum highlights threshold the candidate highlights-threshold value among the two or more candidate highlight-threshold values which minimizes the distortion measure.

2. The method of claim 1, wherein computing the distortion measure comprises computing an absolute value of the difference between the target bitrate ratio and the estimated bitrate ratio.

3. The method of claim 1, wherein computing the pixel complexity measures for pixel values in the first image comprises computing cumulative standard deviation values for pixel values in the first image.

4. The method of claim 1, wherein in the inter-layer prediction function, for all input values to the prediction function lower or equal to the optimum highlights threshold the corresponding predicted output value is equal with the input value.

5. The method of claim 1, further comprising:
receiving with the processor a second image in a second bit depth, wherein the second bit depth is lower than the first bit depth, wherein the first image and the second image represent the same visual scene;
encoding the second image using a base layer encoder to generate a coded BL bitstream;
decoding the BL bitstream to generate a decoded BL image; and
applying the inter-layer prediction function to the decoded BL image to generate a predicted first image.

6. The method of claim 5, further comprising:
computing a residual image based on the predicted first image and the first image;
applying a masking operation to the residual image to generate a masked residual image; and
encoding the masked residual image with an EL encoder to generate a coded EL bitstream, wherein the masking operation comprises setting to zero all pixel values in the residual image that are lower than the optimum highlights threshold.

7. The method of claim 6, further comprising:
applying a non-linear quantizer to the masked residual image to generate a quantized residual image and encoding the quantized residual image with the EL encoder to generate the coded EL bitstream.

8. The method of claim 1, wherein the first bit depth is 12 bits or higher.

9. The method of claim 1, wherein the first image is a high-dynamic range image.

10. The method of claim 1, wherein the bit depth of the base layer (b) is 10 bits and computing $w_m$ comprises computing a cumulative standard deviation of pixels in the first image with value equal to m.

11. The method of claim 1, wherein the output constant value of the inter-layer prediction function corresponds to the optimum highlights threshold.

12. The method of claim 1, wherein instead of computing an optimum highlights threshold an optimum blacks threshold is computed, wherein computing the optimum blacks threshold comprises:
for each of two or more candidate black-threshold values for determining the optimum blacks threshold in the inter-layer prediction function, wherein for all input values to the prediction function lower than the optimum blacks threshold value the corresponding predicted output value is a second constant value:
computing an estimated bitrate ratio based on the candidate blacks-threshold value and the pixel complexity measures;
computing a distortion measure based on the estimated bitrate ratio and the target bitrate ratio; and
outputting as the optimum blacks threshold the candidate blacks-threshold value among the two or more candidate black-threshold values which minimizes the distortion measure.

13. An apparatus comprising a processor and configured to perform the method recited in claim 1.

14. A non-transitory computer-readable storage medium having stored thereon computer-executable instruction for executing a method with one or more processors in accordance with claim 1.

* * * * *